United States Patent
Zwickel et al.

(10) Patent No.: US 12,212,429 B2
(45) Date of Patent: Jan. 28, 2025

(54) SYSTEM AND METHOD FOR DETERMINING ONE OR MORE CODES OF CAN BUS MESSAGES BASED PARTLY ON CAMERA CAPTURED IMAGES

(71) Applicant: ENIGMATOS LTD., Yavne (IL)

(72) Inventors: Liran Zwickel, Or Yehuda (IL); Avi Bitton, Yavne (IL); Eyal Kamir, Ganei Tikva (IL); Alexander Fok, Rehovot (IL); Ralph Diamond, Nesher (IL)

(73) Assignee: ENIGMATOS LTD., Yavne (IL)

( * ) Notice: Subject to any disclaimer, the term of this patent is extended or adjusted under 35 U.S.C. 154(b) by 217 days.

(21) Appl. No.: 18/025,476

(22) PCT Filed: Feb. 8, 2021

(86) PCT No.: PCT/IL2021/050148
§ 371 (c)(1),
(2) Date: Mar. 9, 2023

(87) PCT Pub. No.: WO2022/054038
PCT Pub. Date: Mar. 17, 2022

(65) Prior Publication Data
US 2023/0344670 A1     Oct. 26, 2023

Related U.S. Application Data

(60) Provisional application No. 63/077,633, filed on Sep. 13, 2020.

(51) Int. Cl.
*H04L 12/40* (2006.01)
*G06V 30/19* (2022.01)

(52) U.S. Cl.
CPC ............. *H04L 12/40* (2013.01); *G06V 30/19* (2022.01); *H04L 2012/40215* (2013.01); *H04L 2012/40273* (2013.01)

(58) Field of Classification Search
CPC ........... H04L 12/40; H04L 2012/40215; H04L 2012/40273; H04L 12/417; G06V 30/19
See application file for complete search history.

(56) References Cited

U.S. PATENT DOCUMENTS

| | | | |
|---|---|---|---|
| 10,379,932 B2 | 8/2019 | Tee et al. | |
| 2010/0123564 A1* | 5/2010 | Grunhold | B60R 25/10 340/426.14 |
| 2017/0274820 A1* | 9/2017 | Goudy | G08G 1/166 |

FOREIGN PATENT DOCUMENTS

| | | |
|---|---|---|
| CN | 111130937 A | 5/2020 |
| EP | 2789127 A1 | 10/2014 |

OTHER PUBLICATIONS

Freiberger et al.: "Reverse Engineering Technologies for Remanufacturing of Automotive Systems Communicating via CAN Bus", Journal of Remanufacturing, Dec. 7, 2011;1 (1): 1-4 <https://link.springer.com/article/10.1186/2210-4690-1-6> Dec. 7, 2011 (Dec. 7, 2011) (whole document) 14 pages.

(Continued)

*Primary Examiner* — Keith D Bloomquist
(74) *Attorney, Agent, or Firm* — Snell & Wilmer L.L.P.

(57) ABSTRACT

A method for determining codes of vehicle's Can-bus messages. The method can include sequentially generating, by a message generator, on the Can-bus different message codes selected from a reduced space defined from within a Message-ID and a plurality of data fields of the Can-bus messages as defined by the Can-bus protocol; storing, by a message storage, each generated message code together with a respective timestamp; storing, by an images storage, images that are captured by a camera in synchronization with each said generated message code, each image together with a respective timestamp; comparing, by a processor, each captured image with a latest previously captured image within the images storage; and upon finding, by the proces- (Continued)

sor, a difference between any captured image and a latest captured image and based on the respective timestamp, associating the captured image having a later timestamp with the generated message code of the respective message.

17 Claims, 8 Drawing Sheets

(56) References Cited

OTHER PUBLICATIONS

International Search Report and Written Opinion dated Apr. 21, 2021 in PCT International Patent Application No. PCT/IL2021/050148, 11 pages.

* cited by examiner

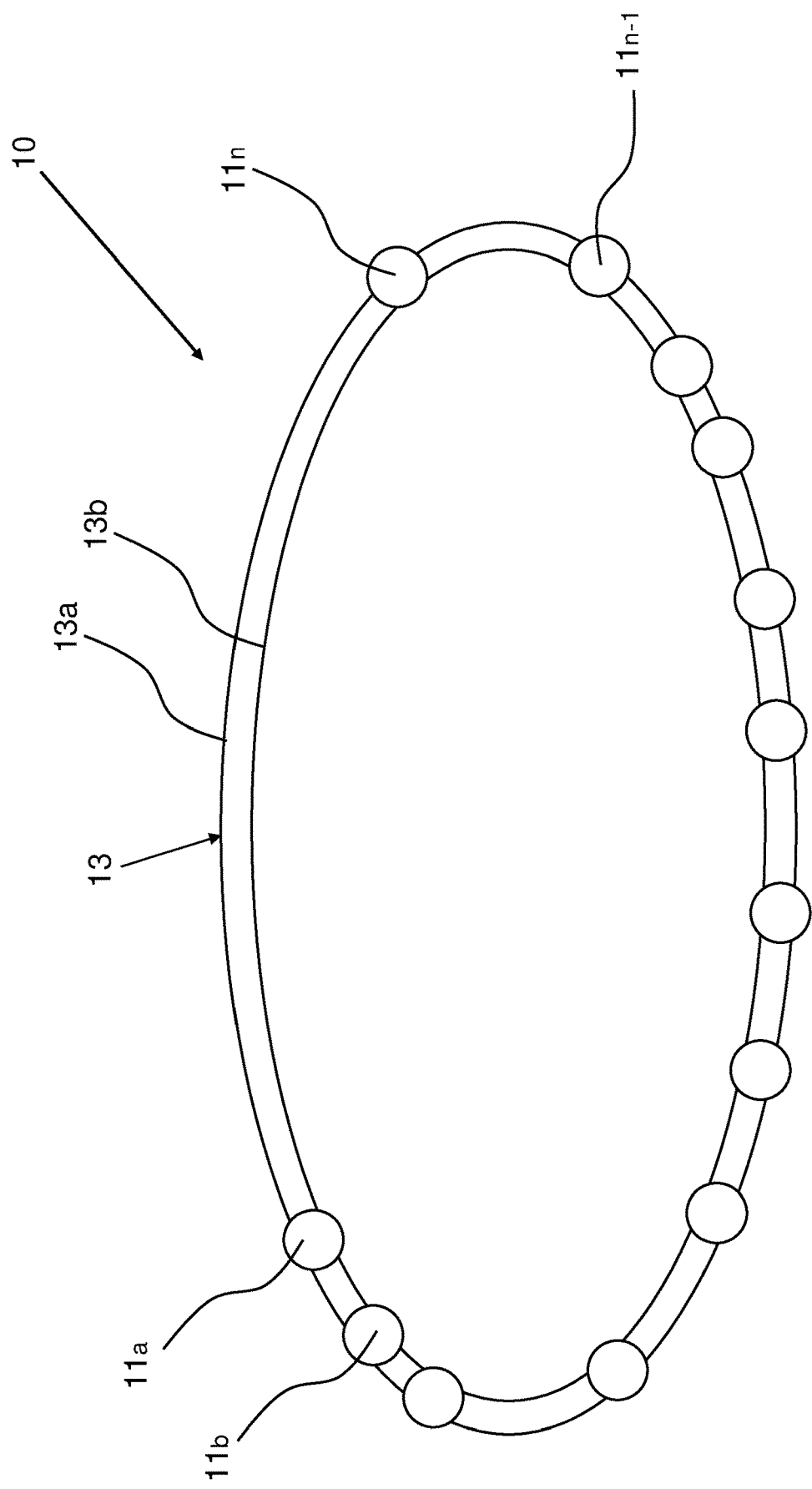
Fig. 1a – Prior Art

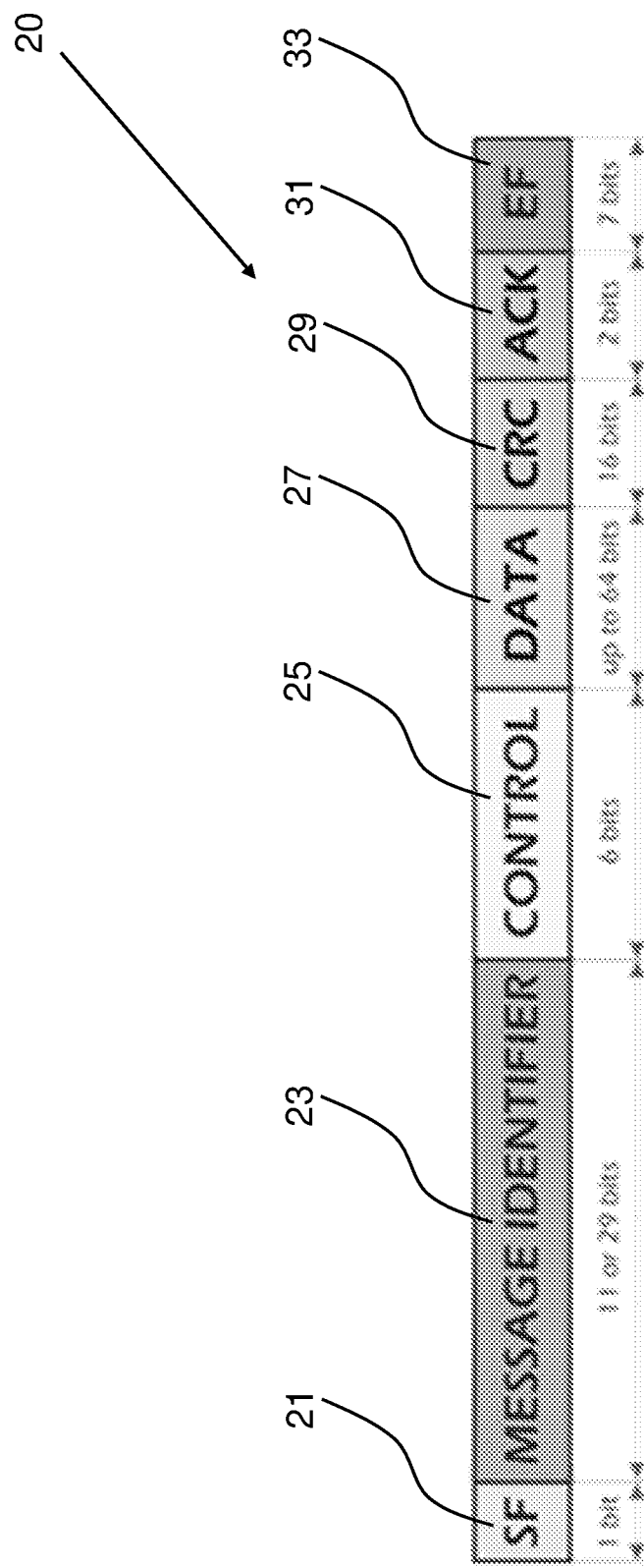
Fig. 1b – Prior Art

SYSTEM AND METHOD FOR DETERMINING ONE OR MORE CODES OF CAN BUS MESSAGES BASED PARTLY ON CAMERA CAPTURED IMAGES

CROSS REFERENCE TO RELATED APPLICATIONS

This application is a U.S. National Stage Entry under 35 U.S.C. § 371 of International Application No. PCT/IL2021/050148 filed Feb. 8, 2021 entitled "SYSTEM AND METHOD FOR DETERMINING A CODE USED IN CAN BUS MESSAGES," which claims priority to and the benefit of U.S. Provisional Patent Application Ser. No. 63/077,633 filed on Sep. 13, 2020. The contents of each application are incorporated herein by reference in their entireties.

FIELD OF THE INVENTION

The invention generally relates to computerized systems in vehicles, such as Can-bus. More specifically, the invention relates to a system and method for determining by a third party a code used in Can-bus messages.

BACKGROUND OF THE INVENTION

The vehicle is a complex network of computers on the move. The terms "car" and "vehicle" are used herein interchangeably. Today's vehicles have dozens (in many cases more than 50) of Electronic Control Units (ECU's) and more than 100 M code lines. Today's cars are already designed to communicate with one another, with road signs, traffic lights, the manufacturer's server, and more.

The Controller Area Network (Can-bus) is the most common and robust vehicle bus standard designed to allow microcontrollers and devices to communicate with each other in applications without a host computer. The Can-bus is a message-based protocol designed for multiplex electrical wiring within automobiles. It allows communication between a plurality of Electronic Control Units (ECUs), also known as nodes. The node's complexity can range from a simple I/O device up to an embedded computer with a CAN interface and sophisticated software. The node may also be a gateway allowing a general-purpose computer (such as a laptop or maintenance apparatus) to communicate over a USB or Ethernet port to devices within a CAN network. All the nodes of the Can-bus are typically connected to the bus through a two-wire connection. The wires are a twisted pair with a 120Ω (nominal) characteristic impedance. Other protocols that are used onboard a vehicle are, for example, Can-FD, Flexray, and Automotive Ethernet Standards.

Each node in the Can-bus is configured for sending and receiving messages, but not simultaneously. A Can-bus message primarily consists of a message-identifier, up to eight data bytes, a CRC, acknowledge slot (ACK), and other overhead slots that are a part of the message. The improved CAN FD protocol extends the length of the message's data field to up to 64 bytes per frame. The message is transmitted serially onto the bus using a non-return-to-zero (NRZ) format and may be received by all nodes. The devices connected by a CAN network are typically sensors, actuators, dashboard displays, and other control devices. These devices are connected to the bus through a host processor, a CAN controller, or a CAN transceiver (all referred to herein as "ECUs"). Each ECU of the Can-bus issues a periodic transmission in a period order of a few μs and up to several tens of μs. Hundreds or even thousands of different messages are transmitted each second.

Many $3^{rd}$ party products provide Can-bus functionalities beyond those provided by the car manufacturer, such as: monitoring of the vehicle and the vehicle components, securing and monitoring the integrity of the Can-bus system, analysis and maintenance of the vehicle's components, predictive maintenance, etc. These $3^{rd}$ party products require interaction with the Can-bus to fulfill their goals. In many cases, such interaction requires knowledge of specific Can-bus message definitions, namely, how each specific message affects a respective vehicle's component. However, each vehicle's manufacturer uses his own proprietary Can-bus message definitions (hereinafter also referred to as "code") within his own-manufactured vehicles. Each manufacturer manages his own-assigned codes by his closely kept database called Can-DB. In many cases, the proprietary code is not available to $3^{rd}$ party entities, who are required to extract the code from existing Can-bus systems by their own efforts. Such extraction of the code from each specific Can-bus system is complicated, and in some cases, consumes weeks or even months of work.

One type of Can-bus messages provides information, indications, or alert messages via the vehicle's dashboard (hereinafter, these messages will be referred to cumulatively as "dashboard messages"). Some $3^{rd}$ party products need the Can-bus proprietary code relating only to this message's type. Other $3^{rd}$ party proprietary products need the Can-bus code relating to all the Can-cus messages, including those relating to the dashboard-type messages.

It is an object of the present invention to provide a system and method for extracting the Can-bus code relating to dashboard messages (namely, information, indications, and alert messages).

It is another object of the invention to provide said system and method that extract the dashboard-messages relating code automatically and promptly.

It is still another object of the invention to enhance said method and system to extract the Can-bus messages' code relating to other vehicle components (that are not dashboard messages).

Other objects and advantages of the invention will become apparent as the description proceeds.

SUMMARY OF THE INVENTION

The invention relates to a system for determining codes of vehicle's Can-bus dashboard messages that are associated with dashboard notifications, comprising: (a) a message generator configured to sequentially generate on the Can-bus different message codes selected from a reduced space defined from within the Message-ID and the Data fields of the Can-bus messages as defined by the Can-bus protocol; (b) a message storage for storing each generated message code, together with its respective timestamp; (c) a camera for capturing an image of the dashboard, in synchronization with each said message generation; (d) an images storage for storing images that are captured by said camera, each image together with its respective timestamp; (e) a processor which is configured to (i) compare each captured image with a latest previously captured image within the storage; (ii) when a difference is observed between any captured image and a latest previously captured image, and based on the image timestamp, associate the later captured image with the code of the respective generated message in said message storage having the same timestamp.

In an embodiment of the invention, said reduced space assumes only a single value of "1" within the Data field of each generated message.

In an embodiment of the invention, said message generator is configured to determine from the Can-bus, in a preliminary stage, all the different message IDs that are used within the Can-bus, and wherein said reduced space is limited to only those determined message IDs withins the message ID field.

In an embodiment of the invention, the system further comprising an OCR which is configured to scan and convert to text each last image in which said difference was observed, and to further associate said text with said respective image and the associated code of the generated message.

In an embodiment of the invention, the system further comprising: (a) a database containing all symbol-type notifications of the dashboard, a location of each said symbol-type notification within the dashboard, and a respective description for each said notification; and (b) said processor which is further configured to (c) determine from (i) a location of the observed difference between said compared two images; and (ii) said database; a description of the issued notification; and (d) associate said determined description with said respective image and the associated code of the generated message.

In an embodiment of the invention, the system further comprising a microphone, for determining the message code of each Can-bus message that activated sound.

The invention also relates to a method for determining codes of vehicle's Can-bus dashboard messages that are associated with dashboard notifications, comprising: (a) providing a message generator for sequentially generating on the Can-bus different message codes selected from a reduced space defined from within Message-ID and Data fields of the Can-bus messages as defined by the Can-bus protocol; (b) storing each generated message code within a message storage, together with its respective timestamp; (c) in synchronization with each said message generation, capturing by a camera an image of the dashboard; (d) storing all said captured images within images storage, together with their respective timestamps; (e) comparing each captured image with a latest stored previously captured image; (f) upon observation of a difference between a last captured image and a latest previously captured image, and based on the later image timestamp, associating said last captured image with the respective code of the generated message having the same timestamp within said message storage.

In an embodiment of the invention, said reduced space assumes only a single value of "1" within the Data field of each generated message.

In an embodiment of the invention, the method further comprising: (a) during a preliminary stage, determining all the different message IDs that are used within the Can-bus; and (b) limiting said reduced space only to those determined message IDs withins the message ID field.

In an embodiment of the invention, the method further comprising applying an OCR to scan and convert to text each last image in which said difference was observed, and further associating said text with said respective last image and the associated code of the generated message.

In an embodiment of the invention, the method further comprising: (a) an initial step of preparing a database containing all symbol-type notifications of the dashboard, a respective location of each said symbol-type notification within the dashboard, and a respective description for each said notification; and (b) upon determining of a difference in each said last image, and based on (i) the location of the observed difference within the last captured image; and (ii) said database; associating the description of the issued notification with said respective last image and the associated code of the generated message.

In an embodiment of the invention, the method further comprising applying a microphone to determine the code of each Can-bus message which activates sound.

BRIEF DESCRIPTION OF THE DRAWINGS

In the drawings:

FIG. 1a generally illustrates in schematic form a typical computerized subsystem of a vehicle;

FIG. 1b schematically depicts a structure of a CAN-bus message;

DETAILED DESCRIPTION OF PREFERRED EMBODIMENTS

Figure 2B:
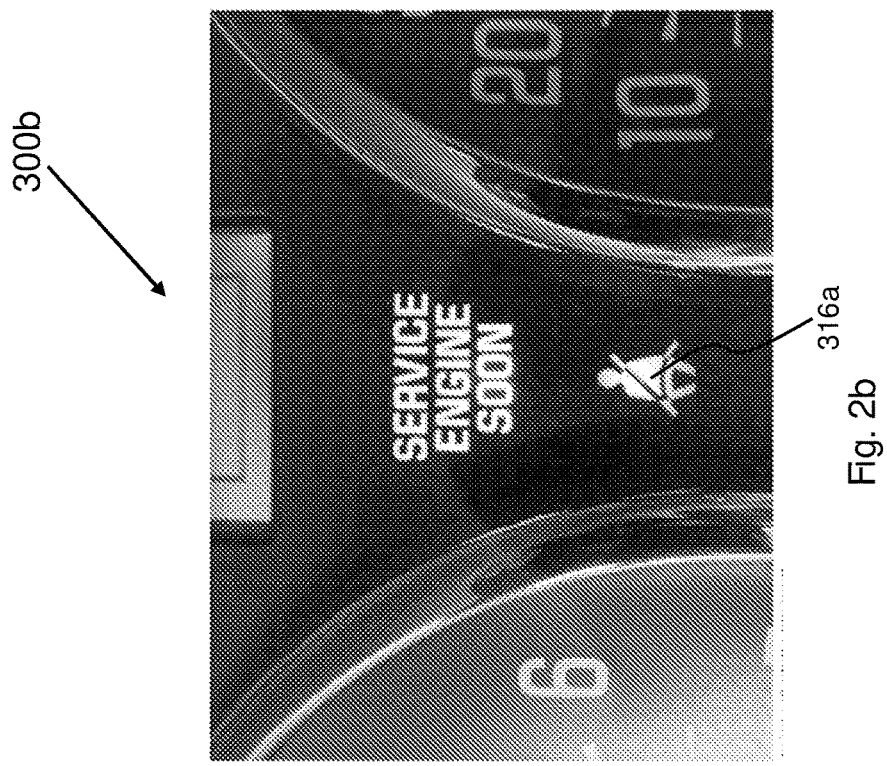
FIG. 2b shows a dashboard which simultaneously displays two alerts to the driver.

FIG. 1a generally illustrates in schematic form a typical computerized subsystem of a vehicle. The subsystem 10 comprises a plurality of ECUs (also known as "nodes") 11a-11n, each controlling or monitoring the status of one or more devices or schemes of the vehicle, such as the gas pedal, the brakes pedal, the steering wheel, the cabin temperature, the airbags, the gear states, issuance of dashboard notifications, etc. The vehicle may include tens of such ECUs, while the ECUs 11a-11n communicate with one another and with the relevant controlled or monitored devices or schemes via the CAN-bus 13.

The CAN-bus 13 is a message-based protocol. Reference is made to FIG. 1b that schematically depicts the structure of a CAN-bus message 20. Message 20 includes the following fields: SF (Start of Field) 21 (1 bit), Message-Identifier 23 (11 or 29 bits), Control 25 (6 bits), Data 27 (up to 64 bits), CRC 29 (16 bits) Ack 31 (2 bits), and EF (End of Frame—7 bits) 33. The Message-Identifier 23 typically defines the type of the message (for example, airbag message, gear control message, wheel drive message, dashboard message, etc.) and the level of priority of the identifier within the Can-bus traffic protocol. In fact, the message-identifier defines to some degree the originator of the message (as each ECU may use either one or several different message-IDs). Depending on a specific format being used, the Message-identifier's length can be either 11-bits (two bytes) in a standard format or 29-bits (four bytes) in an extended CAN-bus format. The SF field 21 indicates which of the two formats (11 or 29 bits) is used for the message-identifier. The Control field 25, also known as the Check Field, displays the number of items of information contained in the data field. The Control field allows any receiver of the message to check whether the received message has all the information transferred. The Data field 27 whose length ranges between 0 to 8 bytes, contains the actual information transmitted on the bus 13, namely the information that can be read by any other ECU 11. The CRC field 29 is a Cyclic Redundancy Check field that contains a 15-bits cyclic redundancy check code. The ACK Field 31, namely the Acknowledge field, allows any receiver of the transmitted message to signal to the message-originator that it has correctly received a message. If an error is detected, the receiver notifies the message originator immediately. The message originator may then resend the message.

Figure 2A:
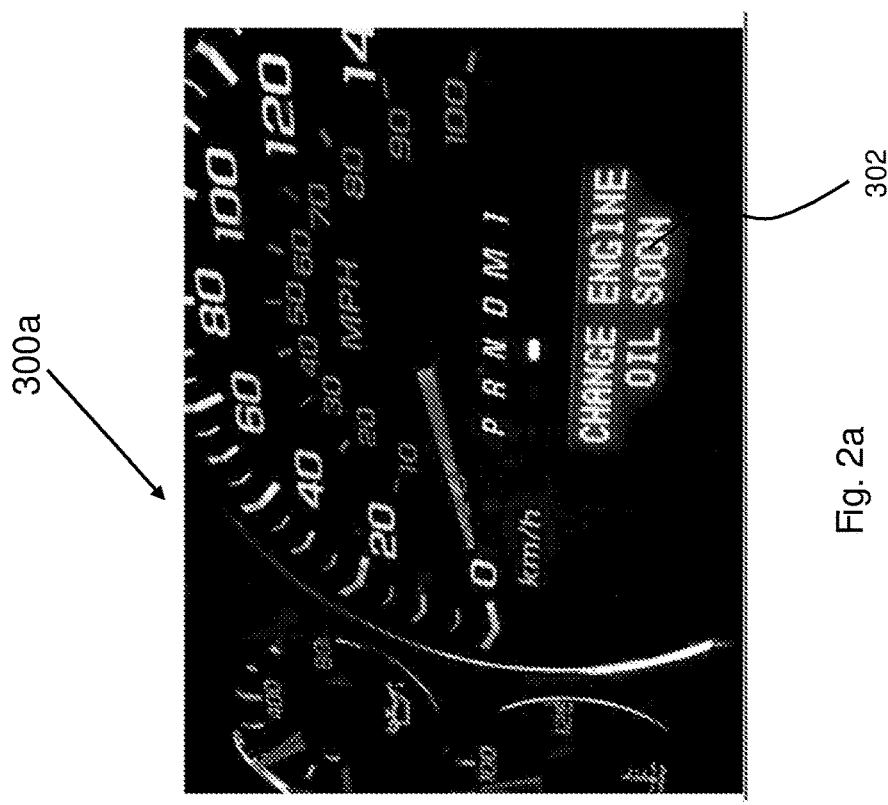
FIG. 2a shows a dashboard which displays a text notification.
Figures 2C, 2D:
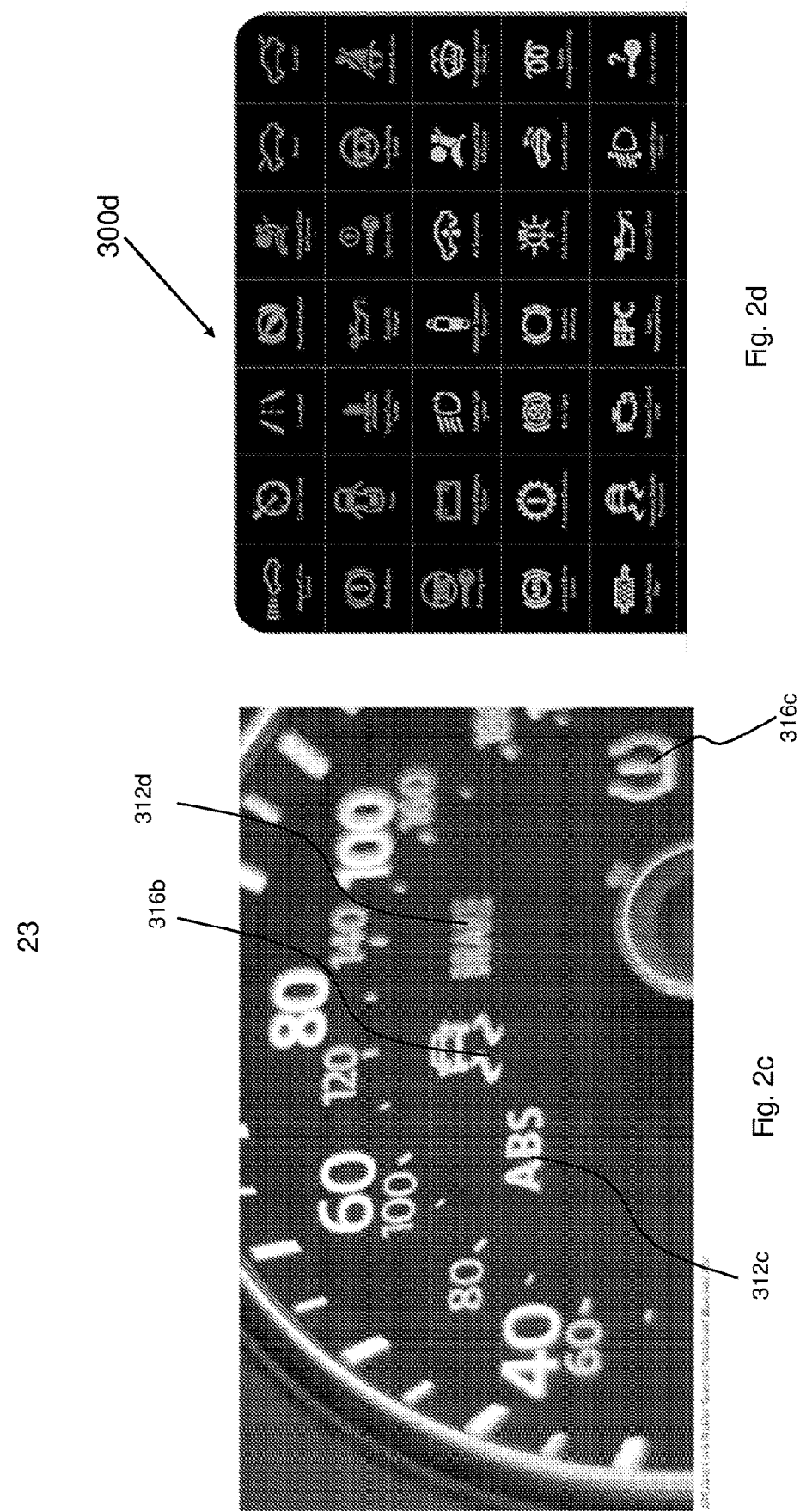
FIG. 2c shows a dashboard with lighted text-type alerts (notifications) 312c and symbol-type alerts (notifications)
FIG. 2d shows various symbols commonly used in a vehicles' dashboard for alert, information, or indication purposes.

As noted, a dashboard of a modern car has the capability of displaying tens, in some cases, even more than 100 different dashboard notifications to a driver. FIG. 2a shows a dashboard 300a, which displays a text notification 302 "CHANGE ENGINE OIL SOON" to the driver. FIG. 2b shows a dashboard 300b, which simultaneously alerts the driver for a "SERVICE ENGINE SOON" (by a text notification), and for fastening the safety belt (by a symbol-type notification). FIG. 2c shows a dashboard 300c with lighted text-type alerts (notifications) 312c and 312d, and two symbol-type alerts (notifications) 316b and 316c. FIG. 2d shows various symbols 300d commonly used in a vehicles' dashboard for alert, information, or indication purposes. As shown, some of the dashboard notifications of FIGS. 2a-2d are symbol type (such as 316a-316c), that use a background lamp that either lights or remains off, some other dashboard notifications (such as notifications 312c and 312d in FIG. 2c) are text-type notifications, however, a background lamp still activates them. Still another type of notification is the text (or symbol) notifications conveyed to the driver via a built-in display, as shown in FIG. 2a. Each of these dashboard notifications is activated by a respective Can-bus message having a specific message ID (within the ID field of the Can-bus message) and data content (within the Data filed of the Can-bus message). Each Can-bus message dedicated to issuing a respective notification on the dashboard will be referred to herein as "dashboard Can-bus message", or briefly as a "dashboard message". One or more ECUs in the Can-bus 13 are responsible for activating a display of dashboard notifications. The present invention system determines for each dashboard notification the Can-bus message that corresponds to it, including at least the respective message ID and Data field code. The system of the present invention achieves this goal for all types of dashboard notifications mentioned above.

Figure 3:
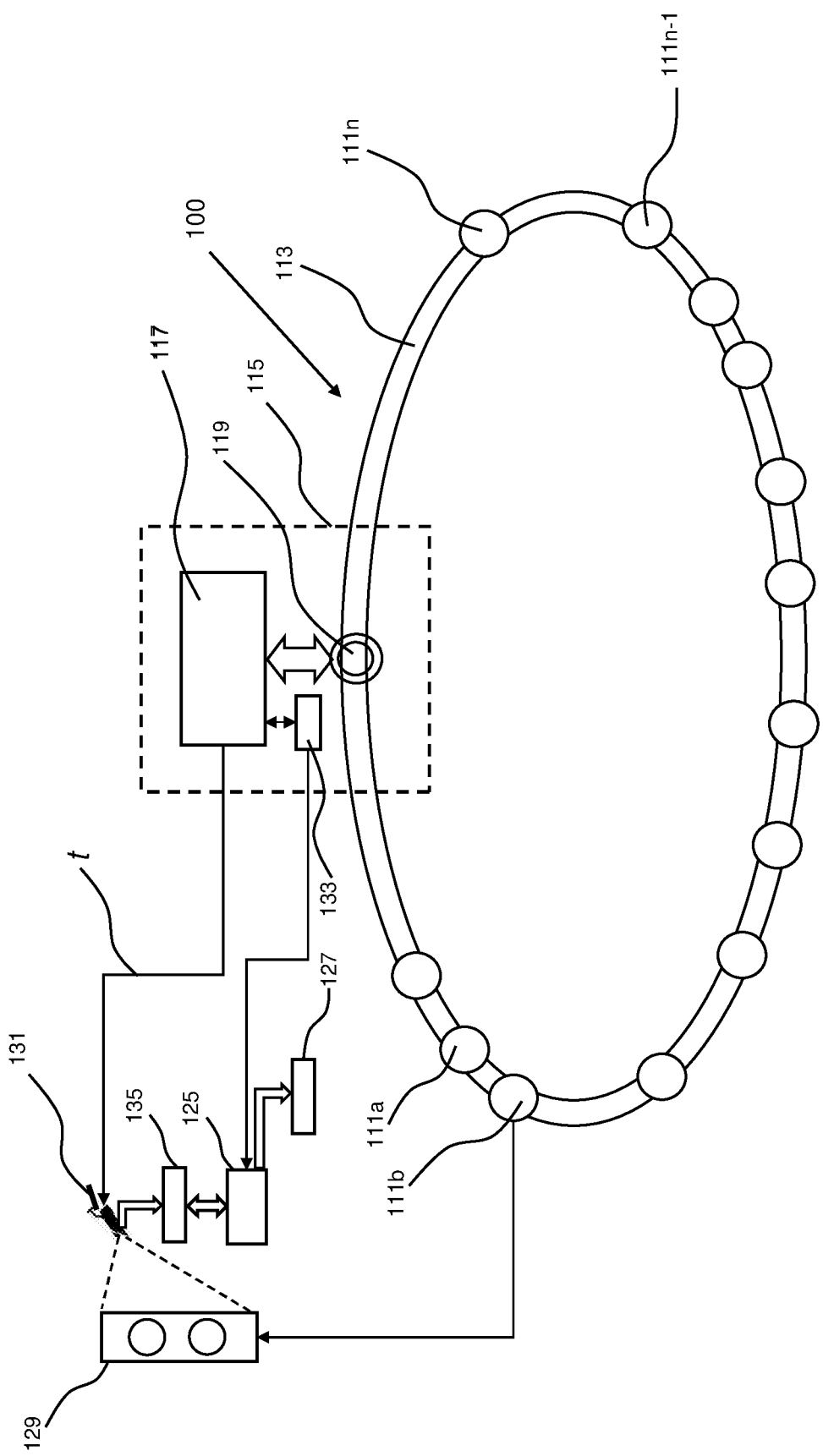
FIG. 3 shows a structure of a system for determining the respective Can-bus dashboard message for each dashboard notification, according to one embodiment.

FIG. 3 shows the structure of a system 100 for determining the respective Can-bus dashboard message for each dashboard notification. Dashboard 129 is configured to display a variety of dashboard notifications to the driver. As previously noted, the dashboard messages include one or more types of notifications, such as text-type notifications and symbol-type notifications. The text and symbol-type notifications are displayed at a dedicated display or lighted by respective background lamps within the dashboard. A combination of a dedicated display and background lamps is also possible. Dashboard 129 is controlled by one or more ECUs 111 (for example, ECU 111b) of the Can-bus 113. Hereinafter, ECU 111b that controls the dashboard (and any additional ECU for controlling the dashboard, if more than one exists) will also be referred to herein as "dashboard controller". Dashboard controller 111b is naturally in communication with the Can-bus 113. One or more ECUs 111 on Can-bus 113 are configured (among other functions) to send dashboard messages to the dashboard controller 111b, which in turn activates a respective dashboard (text or symbol-type) notification on the dashboard. As noted, when the Can-bus code is proprietary, the $3^{rd}$ party provider often needs to determine by his own resources the respective dashboard Can-bus messages (namely, their codes) for each dashboard notification. The $3^{rd}$ party provider needs to determine this code independent of any assistance from the vehicle's manufacturer. The following description provides an automatic or semi-automatic system for carrying out this task.

In the process of the invention a message generator 117 is configured to sequentially (or in any other order) and alternately issue Can-bus messages within a partial permutations space defined from the message ID field (23 in FIG. 1b) and the Data field (27 in FIG. 1b). A combination of the entirety of two fields forms a huge space of up to 93 bits. Testing all the permutation codes possible within these two combined spaces is impractical, in view of the huge number of possibilities (293). The present invention provides a preliminary step which significantly reduces the number of relevant permutations to a reasonable number. First, it has been found that (to the extent checked by the inventors in various car models from different car manufacrurers) the codes of all the dashboard messages involve: (a) a message ID, while the number of message IDs within each given vehicle is limited to at most 100-150; and (b) only a single bit in a state of "1" at any given time within the entire Data field of the message—the location of this "1" bit within the Data field changes depending on the specific dashboard message; the rest of the bits within the Data field are in a state of "0". Once the message_ID codes that are used within the specific vehicle are known or otherwise obtained, the number of possible permutations is therefore reduced to at most X*64, X is the number of message IDs in the specific vehicle (as said, typically up to 100-150 different message IDs, reduced from $2^{11}$ possible message IDs within the Message ID field), and 64 is the maximum number of bits within the Data field of the message. Therefore, in a preliminary stage, the relevant message IDs that are used within the specific vehicle are determined or otherwise obtained. For example, in one embodiment of the invention, message generator 117 is activated to determine all the different message IDs that are used within the specific vehicle. For example, during the preliminary stage message generator 117 is activated as a "sniffer", to first record the traffic on the Can-bus during a given period, for example, several minutes, or any other period during which the entire space of message IDs is expected to appear on the bus. Then, a set including all the different message IDs is extracted from this record. Alternatively, the set of all the used message IDs may be obtained in real time, while the message generator reads and stores only different message IDs, while before storage it verifies that the stored message ID has not been stored yet. The reduced space which is formed from (a) only the extracted message IDs; and (b) only one bit at each given time within the Data field of each dashboard message will be referred to herein as the "relevant space", or "reduced space". It should be noted that any other technique may be used to define or determine the reduced space. Some considerations for this definition may be applied, for example, in cases where more than reduction may be, for example, in cases where more than one bit within the Data field is used within each specific dashboard message. Other techiques may use, for example, prior knowledge. The prior knowledge, may be, for example, knowledge of the message IDs that relate to dashboard messages. Any definition or technique for this determination of the reduced space is within the scope of the invention.

Figure 5A:
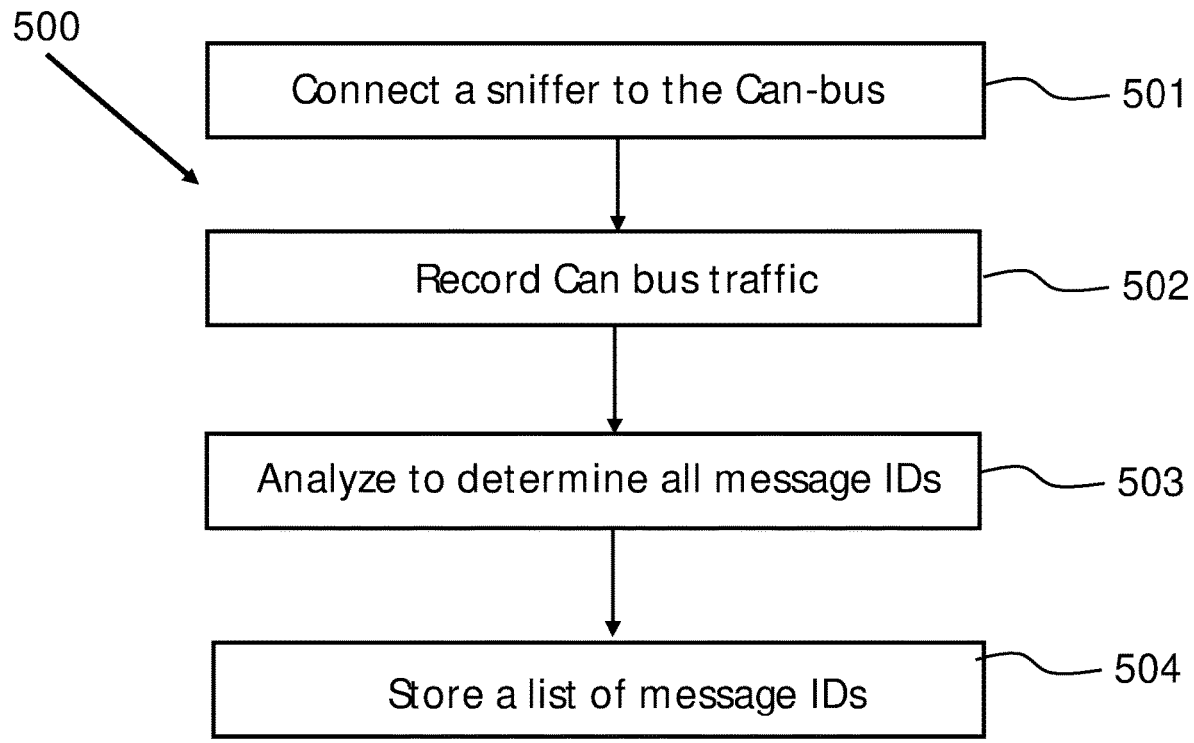
FIG. 5a illustrates in a block diagram form a preliminary stage for extracting all the message IDs used in a Can-bus system.

FIG. 5a illustrates in a block diagram form the preliminary stage 500 for extracting all the message IDs used in a Can-bus system. In step 501 a sniffer is connected to the syste. The sniffer may be, for example, the message generator 117 which is used during the later stage. In step 502, the traffic on the can-bus is recorded. It should be noted that the record include also periodical dashboard messages, possibly null in cases where none of the dashboard notification is initiated. In step 503 the record is analized to determine all the Can bus message IDs existing in the vehicle. The list of message IDs is stored in step 504 to be used at a later stage.

Back to FIG. 3, message generator 117 is an ECU that is configured to sequentially (or in any other order) and alternately issue all possible Can-bus messages within the reduced space as defined by: (a) list 504 (FIG. 5a) of message IDs (23 in FIG. 1); and (b) a single "1" bit only at any given message generation within different bit locations, respectively, of the data field (27 on in FIG. 1). It has been found that for the purpose of the invention, these two fields are sufficient and the only relevant. More specifically, message generator 117 sequentially issues Can-bus messages that in total cover all possible permutations within the reduced space (defined above) of both the Message ID and Data fields. Upon issuing each message by message generator 117, both the respective message code (namely, the message ID and the Data fields) and a respective timestamp of the message are stored in messages storage 133. Furthermore, upon each message issuance by message generator 117, a trigger t is conveyed from the message generator to camera 131, which is mounted in front of dashboard 129, to capture an image of the entire dashboard (or a relevant portion thereof). Camera 131, operating in synchronization with message generator 117, stores all its captured images and respective timestamps within photographs-storage 135.

Therefore, at the end of the entire process, namely, upon completion of the issuance of all possible (namely, all permutations of) Can-bus messages within the reduced space by generator 117, messages storage 133 stores all the issued messages (in fact, the entire range of all possible messages within the reduced space) together with the respective timestamp for each issued message. Photographs storage 135, in turn, stores all the photographs that were captured, together with their respective timestamps. Naturally, during the entire process, several tens (sometimes above 100) of the generated messages (by generator 117) are dashboard messages that affect dashboard 129 by lighting or displaying respective dashboard indications. Processor 125 is provided with an image processing module (not shown) that compares each captured image within storage 135 with a previously captured image. A difference between two sequentially captured images means that a dashboard notification was issued and is displayed within the later-captured image. Following these repeated comparisons, processor 125 keeps within report-storage 127 only those photographs in which a difference was observed and the respective timestamp for each kept photograph (image). Therefore, each of the kept photographs shows the dashboard's state when one dashboard message was issued. Based on the timestamp of each kept photograph within storage 135, processor 125 extracts from the dashboard messages storage 133 the corresponding dashboard message having the same timestamp and associates it with the respective kept photograph within report storage 127. This procedure repeats for all the kept photographs. Therefore, by inspecting each kept image (within report storage 127) and noting the "lighted" or text notification, the user can easily determine for each dashboard notification the corresponding dashboard message (i.e., the message code) that issued this specific dashboard notification.

Figure 4:
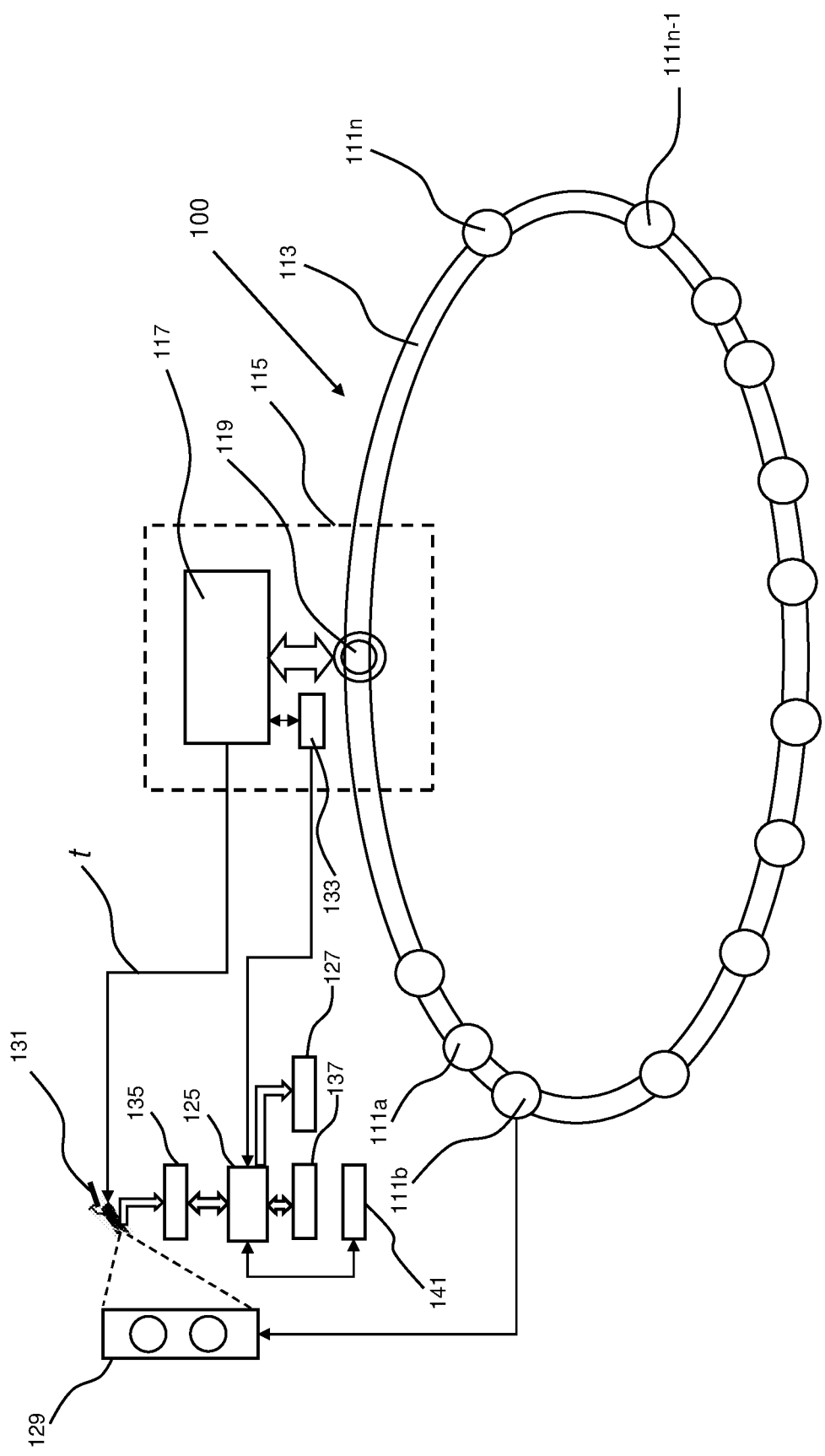
FIG. 4 shows a structure of a system for determining the respective Can-bus dashboard message for each dashboard notification, according to a second embodiment.

FIG. 4 shows an additional embodiment of the invention. As noted, some of the dashboard notifications are of text-type. While the description so far has associated each captured image (containing a visual dashboard notification) with the respective dashboard message, the user in the previous embodiment had to determine the specific notification visually from the image. FIG. 4 shows how this process can be fully automated by including an OCR module 137 and pre-mapping (not shown) each specific expected (namely, available) notification within the dashboard. OCR module 137 examines each image within the report storage 127. When the captured image includes a "lighted" or displayed text, the respective portion of the image is converted to a piece of text, which is then associated with the respective image in report storage 127. The procedure of FIG. 4 is further automated by pre-mapping the dashboard and associating within a database 141 a respective description to each location of a dashboard symbol. Later on, when a difference between two sequentially captured images is determined, a simple image processing procedure applied by processor 125 on the later image can provide the specific location of the image's difference. Then, by utilizing the determined difference' location and the database 141, the respective symbol's description is extracted from database 141 and is associated with the respective dashboard message determined by the procedure previously described with respect to FIG. 3.

Figure 5B:
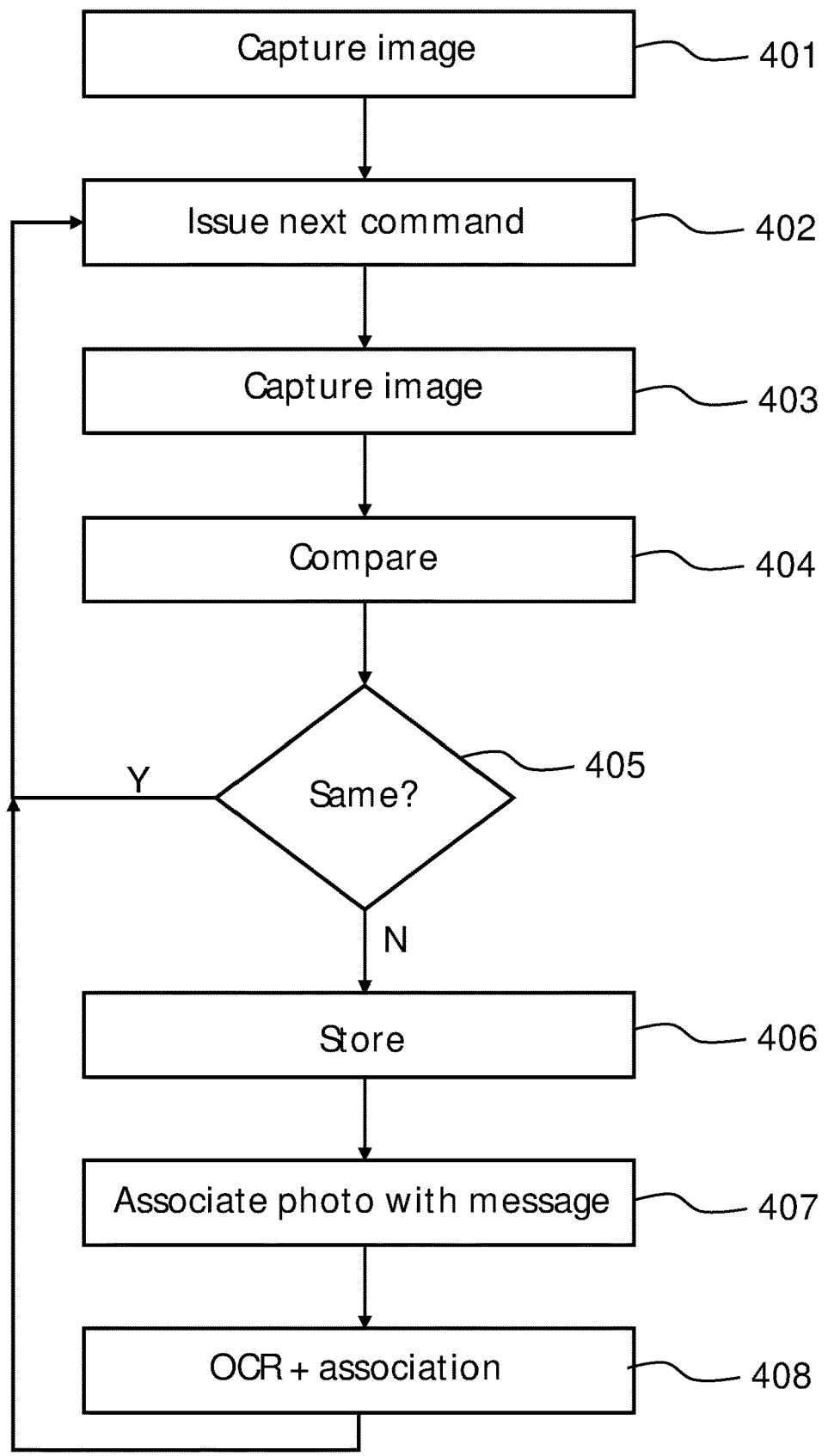
FIG. 5b describes the method of the invention in a flow-diagram form, according to one embodiment.

FIG. 5b describes the method of the invention in a flow-diagram form. In step 401, a first image from the dashboard is captured. In step 402, a first Can-bus message (command) is issued from the reduced space, for example, a message containing a first message_ID from list 504 (FIG. 5a), and a "1" value at the first bit of the data field. In step 403, an additional photograph from the dashboard is captured. In step 404, the last captured image from the dashboard is compared using image processing with the previously captured image to verify whether there is a difference between the two sequentially captured dashboard images. In step 405, if the two captured images have been found the same (i.e., "Y" in step 405), the procedure returns to step 402 to issue the next Can-bus command. The next command, which is now issued, includes incrementation in one or both of the Message_ID and Data fields compared to the previously issued command (as the object is to cover the entire reduced space defined for these two fields). The procedure continues to step 403.

If, however, the comparison of steps 404 and 405 finds a difference between the two compared images (i.e., "N" in step 405), it is concluded that a notification was issued in the dashboard as a result of the last-generated dashboard message. The procedure continues to step 406, in which the latest captured photograph is stored for further processing. Next, in step 407, and based on the respective timestamps, the last issued message code, which caused the difference between the two images (namely, caused the dashboard notification), is associated with the latest stored notification image. At this stage, the user may visually determine the respective notification from the image, or otherwise, the procedure may continue to step 408. In step 408, the procedure automatically determines the exact message notification and associates it with the last generated message's code. More specifically, in step 408 an OCR is applied on the respective image (particularly on the difference observed between the last two images). If the difference is a text-type notification, the text is determined by the OCR and associated with the respective stored item, which now contains the notification description (namely, the text), optionally the photograph, and the respective code of the generated message. Alternatively, if a text message was not observed, step 408 may activate an image processing technique to determine the description of the "lighted" dashboard symbol and to associate this lighted description with the code of the last generated message (in a manner as described above). Next, the procedure returns to step 402, where a next Can-bus command is issued. Procedure 400 is repeated until covering the entire reduced space of Can-bus messages. Upon finalizing the procedure, the user is provided with a report (at report storage 127—FIG. 4) containing the Can-bus message-code, respectively, for each dashboard message and its respective description.

In still another embodiment of the invention, the system further includes a microphone to determine the Can-bus message associated with a vehicle's horn sound. Rather than using the camera, the system uses the microphone. When the microphone determines a horn sound in response to a generated message, the last generated message code is associated with the horn's activation.

In still another embodiment of the invention, the system further includes one or more additional cameras to determine the Can-bus messages associated with other visible components. Rather than directing the camera towards the dashboard, the one or more cameras may be directed to components such as the vehicle's side windows, rear and front lights, wipers, etc. When one of the cameras determines a difference in response to a generated message, the last generated message's code is associated with the determined component's activation. It should be noted that in all the embodiments described above, a video camera may be used, rather than a stills camera. In such a case, the camera operates continuously, and the viseo timestamp is used for the determination.

Preferably, the sequence of the generated messages is as follows: (a) selecting a first message ID from the list of determine message IDs; (b) generating a first message having said first message ID, and a "1" at the first bit of the data field (the rest of the bits within the data field are "0"s); (c) generating a second message having said first message ID, and a "1" at the second bit location of the data field; (d) repeating generation of messages with the first message ID, however each time "moving" the location of the "1" value within the data field to $3^{rd}$, $4^{th}$, . . . $0.64^{th}$ location, respectively (again, the rest of the bits within the data field are "0"s); (e) selecting a second message ID from list 504, and generating a message with said second message ID, with the "1" located at the first bit of the data field; (f) generating an additional message having said second message ID, and a "1" at the second bit location of the data field; . . . (g) continuing with the generation of messages until covering the entire reduced space. For example, assuming that 100 different message IDs are found in the preliminary step, and the Data field contains 64 bits, 6400 different messages are generated to cover the entire reduced space. If a different message is generated once every 1 second, the entire reduced space (6400 permutations) can be covered within about 1.8 hours. If a different message is generated once every 0.5 second, the entire reduced space (6400 permutations) can be covered within about 0.9 hour. In still another embodiment, each same generated message may be repeated, for example 50-100 times, during, for example 0.2-1.0 second, before changing to a different message within the reduced space. In such a case, the trigger t of FIGS. 3 and 4 is generated only one time for each repeated sequence of a same message (in order to avoid repetition of capturing same phtographs). Furthermore, only one message from each said repetition sequence is stored in messages storage 133.

It has been found by the inventors the generation of messages by the message generator 117 can be made at a rate of a new different message every 0.5 second or even faster (for example, 0.2 second) and still to get the desired results. This fast rate is possible thanks to the fact that images can be captured at a high rate, and the analysis of images (if in real-time) can be performed in a fast manner by currently existing computers.

The system and method of the invention can be used in other in-vehilce network protocols—e.g., Ethernet, Flexray, CAN-FD, etc. The system can also generate CAN messages in AUTOSAR compliant vehicles while mimicking the AUTOSAR required message validation protocol—with custom CRC and message counter.

Example

An analysis was performed on a MAN vehicle dashboard to determine the dashboard messages' codes and the respective dashboard notification for each dashboard message. At the end of the procedure, 120 dashboard notifications and associated dashboard messages were automatically determined. The entire procedure was completed within about 1 hour. 60 different Can-bus commands were issued during this procedure. About 4000 various messages were generated during about 1 hour.

While some embodiments of the invention have been described by way of illustration, it will be apparent that the invention can be carried into practice with many modifications, variations, and adaptations, and with the use of numerous equivalent or alternative solutions that are within the scope of persons skilled in the art, without departing from the spirit of the invention or exceeding the scope of the claims.

The invention claimed is:
1. A method for determining codes of vehicle's Can-bus messages, comprising:
sequentially generating, by a message generator, on the Can-bus different message codes selected from a reduced space defined from within a Message-ID and a plurality of data fields of the Can-bus messages as defined by the Can-bus protocol;
storing, by a message storage, each generated message code together with a respective timestamp;
storing, by an images storage, images that are captured by a camera in synchronization with each said generated message code, each image together with a respective timestamp;
comparing, by a processor, each captured image with a latest previously captured image within the images storage;
upon finding, by the processor, a difference between any captured image and a latest captured image and based on the respective timestamp, associating the captured image having a later timestamp with the generated message code of the respective generated message in said message storage having the same timestamp; and scanning and converting, by an OCR, readable characters of each captured image having the later timestamp in which said difference was found and associating said readable characters with said respective image and the generated message code of the generated message.

2. The method of claim 1, wherein said reduced space assumes only a single value of "1" within the plurality of data fields of each generated message.

3. The method of claim 1, further comprising:
during a preliminary stage, determining all the different message IDs that are used within the Can-bus; and
limiting said reduced space only to those determined message IDs within the message ID.

4. The method of claim 1, further comprising:
an initial step of preparing a database containing all symbol-type notifications, a respective location of each said symbol-type notification, and a respective description for each said notification; and
upon determining of a difference in each said last captured image, and based on (i) the location of the observed difference within the last captured image; and (ii) said database, associating the description of the issued notification with said respective last captured image and the associated code of the generated message code.

5. The method of claim 1, further comprising:
applying a microphone to determine the generated message code of each Can-bus message which activates sound.

6. A system for determining codes of vehicle's Can-bus messages, each said message being associated with a notification, comprising:
a message generator configured to sequentially generate on the Can-bus different message codes selected from a reduced space defined from within a Message-ID and a plurality of data fields of the Can-bus messages as defined by a Can-bus protocol;
a message storage for storing each generated message code, together with a respective timestamp;
a camera in synchronization with each said generated message code;
an images storage for storing images that are captured by said camera, each image together with its respective timestamp; and
a processor which is configured to (a) compare each captured image with a latest previously captured image within the images storage; (b) when a difference is found between any captured image and a latest captured image, and based on the respective timestamp, associate the captured image having a later timestamp with the generated message code of the generated message code of the respective generated message in said message storage having the same timestamp.

7. The system of claim 6, wherein said reduced space assumes only a single value of "1" within the plurality of data fields of each generated message.

8. The system of claim 6, wherein said message generator is configured to determine from the Can-bus, in a preliminary stage, all the different message IDs that are used within the Can-bus, and wherein said reduced space is limited to only those determined message IDs within the message ID.

9. The system of claim 6, further comprising an OCR which is configured to scan and convert to readable characters each last image in which said difference was observed, and to further associate said readable characters with said respective image and the associated code of the generated message.

10. The system of claim 6, further comprising:
a database containing all symbol-type notifications, a location of each said symbol-type notification, and a respective description for each said notification; and
said processor which is further configured to (c) determine from (i) a location of the observed difference between said two compared images; and (ii) said database; a description of the issued notification; and (d) associate said determined description with said respective image and the associated code of the generated message.

11. The system of claim 6, further comprising a microphone, for determining the message code of each Can-bus message that activated sound.

12. A method for determining codes of vehicle's Can-bus messages that are associated with notifications, comprising:
providing a message generator for sequentially generating on the Can-bus different message codes selected from a reduced space defined from within the Message-ID and the plurality of data fields of the Can-bus messages as defined by the Can-bus protocol;
storing each generated message code within a message storage, together with its respective timestamp;
in synchronization with each said message generation, capturing by a camera an image;
storing all said captured images within images storage, together with their respective timestamps;
comparing each captured image with a latest stored previously captured image; and
upon observation of a difference between a last captured image and a latest previously captured image, and based on the later image timestamp, associating said last captured image with the respective code of the generated message having the same timestamp within said message storage.

13. The method of claim 12, wherein said reduced space assumes only a single value of "1" within the plurality of data fields of each generated message.

14. The method of claim 12, further comprising:
during a preliminary stage, determining all the different message IDs that are used within the Can-bus; and
limiting said reduced space only to those determined message IDs within the message ID.

15. The method of claim 12, further applying an OCR to scan and convert to readable characters each last image in which said difference was observed, and further associating said readable characters with said respective last image and the associated code of the generated message.

16. The method of claim 12, further comprising:
an initial step of preparing a database containing all symbol-type notifications, a respective location of each said symbol-type notification, and a respective description for each said notification; and
upon determining of a difference in each said last image, and based on (i) the location of the observed difference within the last captured image; and (ii) said database; associating the description of the issued notification with said respective last image and the associated code of the generated message.

17. The method of claim 12, further comprising:
applying a microphone to determine the code of each Can-bus message which activates sound.

* * * * *